United States Patent
Felix (10) Patent No.: US 10,629,072 B2
(45) Date of Patent: Apr. 21, 2020

(54) LIDAR AND VISION VEHICLE SENSING

(71) Applicant: Ford Global Technologies, LLC, Dearborn, MI (US)

(72) Inventor: Rodrigo Felix, Atizapan de Zaragoza/Estado de Mexico (MX)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 250 days.

(21) Appl. No.: 15/298,389

(22) Filed: Oct. 20, 2016

(65) Prior Publication Data

US 2018/0114436 A1 Apr. 26, 2018

(51) Int. Cl.

| | |
|---|---|
| B60W 50/00 | (2006.01) |
| G01S 17/02 | (2020.01) |
| G05D 1/00 | (2006.01) |
| G08G 1/015 | (2006.01) |
| G08G 1/02 | (2006.01) |
| G08G 1/04 | (2006.01) |
| G08G 1/052 | (2006.01) |
| G06K 9/00 | (2006.01) |
| G01S 7/48 | (2006.01) |

(Continued)

(52) U.S. Cl.
CPC ............ G08G 1/015 (2013.01); B60W 50/00 (2013.01); G01S 7/4802 (2013.01); G01S 17/86 (2020.01); G01S 17/89 (2013.01); G01S 17/931 (2020.01); G05D 1/0088 (2013.01); G05D 1/0238 (2013.01); G05D 1/0242 (2013.01); G06K 9/00805 (2013.01); G08G 1/04 (2013.01); G08G 1/052 (2013.01); G08G 1/056 (2013.01); B60W 2420/40 (2013.01); B60W 2420/52 (2013.01)

(58) Field of Classification Search
CPC ......... B60W 2420/40; B60W 2420/52; B60W 50/00; G01S 17/023; G01S 17/936; G05D 1/0088; G05D 1/0238; G05D 1/0242; G06K 9/00825; G08G 1/015; G08G 1/04; G08G 1/052; G08G 1/056; G06T 2207/30252

See application file for complete search history.

(56) References Cited

U.S. PATENT DOCUMENTS 5,809,161 A * 9/1998 Auty ..................... G01P 3/38
340/937
7,756,298 B2 7/2010 Miyahara et al.
(Continued)

FOREIGN PATENT DOCUMENTS

| CN | 104536009 A | 4/2015 |
| EP | 3196863 A1 | 7/2017 |

(Continued)

OTHER PUBLICATIONS

UKIPO Search Report for Application No. GB1716847.7 dated Feb. 19, 2018.

*Primary Examiner* — Jerrah Edwards
(74) *Attorney, Agent, or Firm* — Frank A. MacKenzie; Bejin Bieneman PLC (57) ABSTRACT

A computer is programmed to identify a vehicle in an infrared image, determine a body type of the vehicle based on the infrared image, and predict coordinates of one or more vehicle elements based at least on the determined body type. The computer is further programmed to then perform a plurality of LIDAR sensor sweeps and, based on the LIDAR sensor sweeps, determine whether the vehicle elements are at the predicted coordinates.

20 Claims, 4 Drawing Sheets

(51) Int. Cl.
  *G01S 17/89*  (2020.01)
  *G01S 17/86*  (2020.01)
  *G01S 17/931*  (2020.01)
  *G05D 1/02*  (2020.01)
  *G08G 1/056*  (2006.01)

(56) References Cited

U.S. PATENT DOCUMENTS

| | | | |
|---|---|---|---|
| 7,961,906 B2 | 6/2011 | Ruedin | |
| 8,072,663 B2* | 12/2011 | O'Neill | G02B 26/105 |
| | | | 359/199.3 |
| 8,195,394 B1 | 6/2012 | Zhu et al. | |
| 8,346,463 B2 | 1/2013 | Bärgman et al. | |
| 8,452,054 B2 | 5/2013 | Kuoch et al. | |
| 9,052,393 B2 | 6/2015 | Kriel et al. | |
| 9,201,421 B1 | 12/2015 | Fairfield et al. | |
| 9,396,403 B2* | 7/2016 | Karkowski | G06K 9/325 |
| 2005/0195383 A1 | 9/2005 | Breed et al. | |
| 2010/0053715 A1* | 3/2010 | O'Neill | G01S 7/4817 |
| | | | 359/199.3 |
| 2013/0300875 A1 | 11/2013 | Strandemar et al. | |
| 2014/0035775 A1 | 2/2014 | Zeng et al. | |
| 2015/0294174 A1* | 10/2015 | Karkowski | G06K 9/325 |
| | | | 382/182 |
| 2015/0346326 A1 | 12/2015 | Chidlovskii et al. | |

FOREIGN PATENT DOCUMENTS

| | | |
|---|---|---|
| JP | S62231190 A | 10/1987 |
| WO | 2016/015546 A1 | 2/2016 |

\* cited by examiner

LIDAR AND VISION VEHICLE SENSING

BACKGROUND

An autonomous vehicle can operate based on instructions from a computer controller without user intervention. For example, steering, acceleration, and braking of the autonomous vehicle each typically depend on data provided by one or more vehicle detection sensors, including data relating to other vehicles sharing a roadway with the autonomous vehicle. Autonomous vehicles can be equipped with various types of vehicle detection sensors. Operation of an autonomous vehicle may be improved by combining data from various types of vehicle detection sensors.

DETAILED DESCRIPTION

Introduction

With reference to the Figures, wherein like numerals indicate like parts throughout the various figures, a host vehicle 100 computer 110 is programmed to identify a second vehicle 200 in an infrared image, and determine a body type of the second vehicle 200 based on the infrared image. The computer 110 is programmed to predict coordinates of one or more vehicle 200 elements, e.g., pillars 220, bumpers, windows 230, etc., based at least on the determined body type and then perform a plurality of LIDAR sensor sweeps based on the infrared data. The computer 110 is further programmed to then determine whether the elements are at the predicted coordinates based on the LIDAR sensor sweeps.

System Elements

Figure 1:
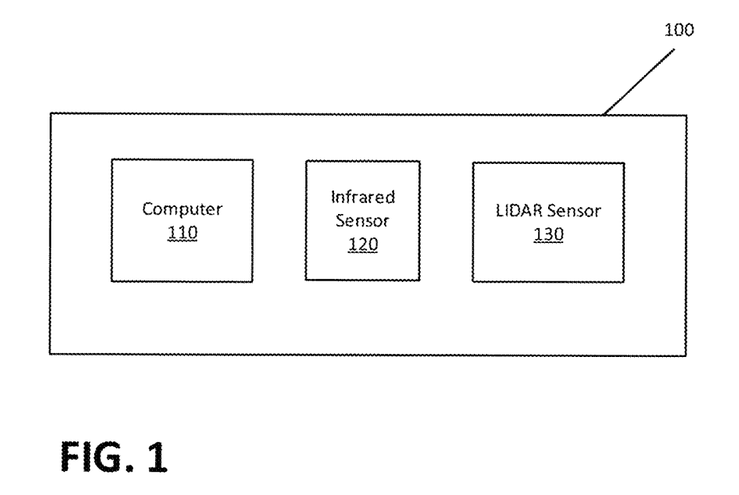
FIG. 1 is a block diagram of an exemplary vehicle including and infrared/LIDAR sensing system.

FIG. 1 illustrates an example host vehicle 100 including a computer 110, an infrared sensor 120, a (Light Detection and Ranging) LIDAR sensor 130, and other components discussed herein below. The vehicles 100 may be powered in variety of known ways, e.g., with an electric motor and/or internal combustion engine. To distinguish from other vehicles 200 (discussed below), the vehicle 100 may be referred to as the "first" vehicle 100 herein.

The computer 110 includes a processor and a memory such as are known. The memory includes one or more forms of computer-readable media, and stores instructions executable by the computer 110 for performing various operations, including as disclosed herein.

The computer 110 may operate the vehicle 100 in an autonomous or semi-autonomous mode. For purposes of this disclosure, an autonomous mode is defined as one in which each of vehicle 100 propulsion, braking, and steering are controlled by the computer 110; in a semi-autonomous mode the computer 110 controls one or two of vehicle 100 propulsion, braking, and steering.

The computer 110 may include programming to operate one or more of vehicle brakes, propulsion (e.g., control of acceleration in the vehicle by controlling one or more of an internal combustion engine, electric motor, hybrid engine, etc.), steering, climate control, interior and/or exterior lights, etc., as well as to determine whether and when the computer 110, as opposed to a human operator, is to control such operations.

The computer 110 may include or be communicatively coupled to, e.g., via a vehicle communications bus as described further below, more than one processor, e.g., controllers or the like included in the vehicle for monitoring and/or controlling various vehicle controllers, e.g., a powertrain controller, a brake controller, a steering controller, etc. The computer 110 is generally arranged for communications on a vehicle communication network such as a bus in the vehicle such as a controller area network (CAN) or the like.

Via the vehicle network, the computer 110 may transmit messages to various devices in the vehicle and/or receive messages from the various devices, e.g., the infrared sensor 120, the LIDAR sensor 130, actuators, etc. Alternatively or additionally, in cases where the computer 110 actually comprises multiple devices, the vehicle communication network may be used for communications between devices represented as the computer 110 in this disclosure. Further, as mentioned below, various controllers and/or sensors may provide data to the computer 110 via the vehicle communication network.

The vehicle 100 may include one or more infrared sensors 120, e.g., infrared camera(s). An infrared sensor 120 is an electronic sensor such as is known that measures infrared light radiating from objects in a field of view. The data may be received by the computer 110 in a known manner. In one example, the computer 110 may generate infrared image data, e.g., an infrared image including an infrared projection of a second vehicle 200 (see FIG. 2), based on the data received from the first vehicle 100 infrared sensor(s) 120. The infrared sensors 120 may be mounted in various locations in the vehicle 100, e.g., in a front or rear vehicle light enclosure, behind the windshield, in the side view mirror packages, etc. The field of view of the infrared sensor(s) 120 may include an area exterior to the first vehicle 100. To generate image data, additionally or alternatively, the first vehicle 100 may include camera sensors. The camera sensors may include chips, image sensors, and optical components. The camera sensors may output image data based on the optical signals captured by the image sensor(s) of the camera sensor.

The vehicle 100 may include one or more LIDAR sensor(s) 130, providing data encompassing at least some of an exterior of the vehicle 100. The LIDAR data may be received by the computer 110 from LIDAR sensors 130 in a known manner, e.g., via a first vehicle 100 network. The LIDAR data may include coordinates, e.g., in a 3-dimensional coordinate system maintained by the first vehicle 100 computer 110, of one or more objects relative to the first vehicle 100. The LIDAR data may further include other data pertaining to other objects such as size, relative speed to the host vehicle 100, etc. A LIDAR sensor 130 may sweep an area in the LIDAR sensor 130 field of view by transmitting LIDAR beams, e.g., laser beams, and receive reflections of the transmitted LIDAR beams. Typically, a LIDAR sensor 130 can provide data for mapping physical features of sensed objects with a very high resolution, and can target a wide range of materials, including transparent vehicle elements, e.g., a glass window 230, vehicle lights 260, 270, etc., or opaque vehicle elements, e.g., pillars 220, wheels 250, doors, etc. Moreover, as is known, when transmitted beams from a LIDAR sensor 130 are directed to a transparent or semi-transparent object, the transmitted LIDAR beam may be partially reflected by the object, and may also partially penetrate the object. Thus, the vehicle 100 computer 110 may be programmed to determine based on the received reflection of the LIDAR beam, whether the object reflecting the LIDAR beam has a transparent surface, e.g., glass, or an opaque surface, e.g., metal, rubber, etc.

Actuators of the first vehicle 100 are implemented via circuits, chips, or other electronic components that can actuate various vehicle subsystems in accordance with appropriate control signals as is known. The actuators may be used to control braking, acceleration, and steering of the first vehicle 100. As an example, the first vehicle 100 computer 110 may output control instructions to control the actuators.

Figure 2:
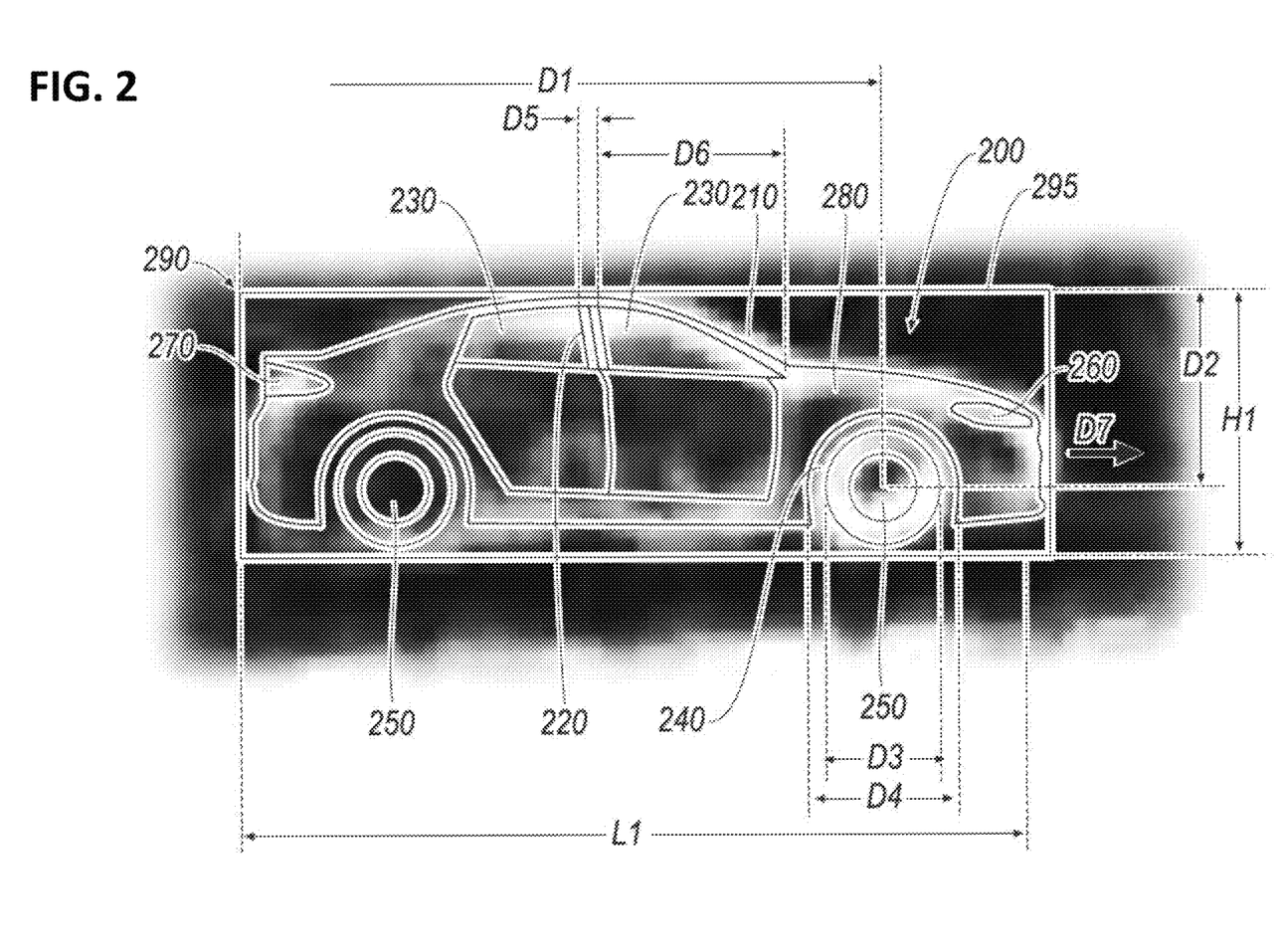
FIG. 2 shows an infrared image of a second vehicle, captured by the infrared sensor of the vehicle in FIG. 1, with a diagram of vehicle body elements superimposed thereon.

FIG. 2 illustrates an example infrared image 205 of a second vehicle 200, based on the first vehicle 100 infrared sensor 120, and a diagram 210 of second vehicle 200 body elements superimposed on the infrared image 205.

The second vehicle 200 may be powered in variety of known ways, e.g., with an electric motor and/or internal combustion engine. The vehicle 200 includes a body 280 which may have various types including convertible, compact, mid-size sedan, full-size sedan, sport utility, minivan, van, and pickup truck. Alternatively or additionally, other body type classifications may be used. The vehicle 200 body 280 may include one or more of a pillar 220, a window 230, a wheel well 240, a wheel 250, a front light 260, and a rear light 270.

The body 280 types may be defined based at least on physical characteristics, e.g., size, shape, etc., of the vehicle 200 body 280. Vehicles 200 with a specific body 280 type, e.g., mid-size sedan, from various vehicle models and/or manufacturers may have substantially similar physical characteristics. For example, vehicles 200 bodies 280 with sedan body type may have substantially similar dimensions such as a length of hood, a distance between front and rear wheels 250 centers, a height of vehicle 200 roof, etc. "Substantially similar" is a deviation in dimensions of less than a predetermined threshold, e.g., 5%.

The diagram 210 illustrates a body type of the vehicle 200 body 280, as shown in FIG. 2. The diagram 210 may be based on data associated with the body type of vehicle 200 body 280. The data associated with a body type may include dimensions of the body 280 and/or dimensions of various vehicle 200 elements. For example, the body type data may include dimensions associated with the vehicle 200 or vehicle 200 elements, e.g. a height H1, a length L1, a wheel diameter D3, a wheel well diameter D4, a pillar width D5, and/or a side window 230 length D6. Additionally or alternatively, the body type data may include coordinates of vehicle 200 elements, e.g., relative to a reference point such as a corner point 290, including coordinates D1, D2 of a front wheel 250, etc. Additionally or alternatively, the data associated with the body type may include distances between vehicle 200 elements, e.g., distance between front and rear wheels 250 centers, and/or data indicating a shape of the vehicle 200 body 280.

Prediction of Vehicle Elements Coordinates

Referring now to FIGS. 1-2, the first vehicle 100 computer 110 is programmed to receive infrared image(s) 205 data from the first vehicle 100 infrared sensor(s) 120 and identify the vehicle 200 based at least on the infrared image 205 data using image processing techniques such as are known. The first vehicle 100 computer 110 is further programmed to determine a body type of the vehicle 200 based on the infrared image 205 and predict coordinates of one or more vehicle elements, e.g., the body 280 components such as wheels 250, based at least on the determined body type. Additionally, the first vehicle 100 computer 110 may be programmed to calculate coordinates of a rectangle 295 surrounding the identified second vehicle 200 in the infrared image 205. Alternatively, the first vehicle 100 computer 110 may calculate coordinates of a solid rectangle 295, i.e., a three-dimensional hyper rectangle. For example, when both of a front window 230 and side windows 230 of the second vehicle 200 are visible in the infrared image 205, then the computer 110 may calculate coordinates of a three dimensional hyper rectangle 295 surrounding the second vehicle 200.

In one example, the first vehicle 100 computer 110 may be programmed to determine the body type of the second vehicle 200 body 280 based at least in part on second vehicle 200 body 280 physical characteristics, e.g., a shape of the second vehicle 200 body 280, dimensions such as the length L1, the height H1, and/or width of the vehicle 200 body 280, and/or distances between the second vehicle 200 elements.

In one example, the first vehicle 100 computer 110 may predict the coordinates of various vehicle 200 elements, e.g., body 280 components, based at least on the data associated with the determined body type and the data included in the infrared image 205. The predicted coordinates may include dimensions of vehicle 200 elements, distances between vehicle 200 elements, and/or coordinates of vehicle 200 elements relative to a reference point 290 such as a corner of the rectangle 295. For example, based on the determined body type, the first vehicle 100 computer 110 may predict that the vehicle 200 pillar 220 has a width D5. However, depending on the received infrared image 205, the first vehicle 100 computer 110 may be unable to identify the vehicle 200 pillar 220 based on the infrared image 205, e.g., due to blurriness of the infrared image 205. Accordingly, the first vehicle 100 computer 110 may be unable to identify the pillar 220 width only based on the infrared image 205. Therefore, the first vehicle 100 computer 110 may be programmed to predict the coordinates of second vehicle 200 elements, e.g., predict that the pillar 220 has a width D5, based at least on the infrared image 205 and data associated with the determined body type. As another example, the first vehicle 100 computer 110 may predict the coordinates D1, D2 of the front wheels 250, e.g., predict that the center of the front wheel 250 is located at the coordinates D1, D2 relative to a reference point 290.

The coordinates of second vehicle 200 elements may be defined in a three-dimensional coordinate system with a reference point, e.g., a predetermined point in the first vehicle 100 infrared sensor 120 field of view. Additionally or alternatively, the coordinates may be defined in a two dimensional coordinate system based on a projection of the first vehicle 100 exterior in the infrared image 205.

In another example, the first vehicle 100 computer 110 may be programed to receive multiple infrared images 205 and identify a direction of movement of the identified second vehicle 200 based at least in part on the received infrared images 205. The first vehicle 100 computer 110 may be then programmed to predict coordinates of the second vehicle 200 elements further based on the identified direction of movement. For example, the first vehicle 100 computer 110 may determine a location of the second vehicle 200, e.g., relative to a first vehicle 100 location, in each of the infrared images. The first vehicle 100 computer 110 can then determine the direction of the second vehicle 200 movement based on the determined second vehicle 200 locations, e.g., based on changes in the second vehicle 200 location. For example, the first vehicle 100 computer 110 may select the second vehicle 200 elements for coordinates prediction based on the determined direction of movement. In one example, based on the determined direction of movement D7, as shown in FIG. 2, the first vehicle 100 computer 110 may determine that the second vehicle 200 front windshield window 230 is fully or partially invisible in the infrared image 205 and therefore coordinates of the window 230 cannot be predicted from the infrared image 205.

In yet another example, the first vehicle 100 computer 110 may be programmed to predict an orientation of the identified second vehicle 200 with respect to the first vehicle 100 based on the infrared image 205. An orientation of the second vehicle 200 with respect to the first vehicle 100 can be defined as an angle between the longitudinal axes of the vehicles 100, 200. The first vehicle 100 computer 110 can then predict coordinates of one or more vehicle elements of the identified second vehicle 200 further based on the predicted orientation of the identified second vehicle 200 with respect to the first vehicle 100.

To predict the coordinates of second vehicle 200 elements, the first vehicle 100 computer 110 may be programmed to project a size of the identified second vehicle 200 based on the received infrared image 205 and predict the coordinates of the second vehicle 200 elements further based on the projected size and a size associated with the identified vehicle body type. For example, a body type associated with the second vehicle 200 with mid-size sedan body type may indicate that a vehicle 200 length is 440 cm. Further, the first vehicle 100 computer 110 may determine that the second vehicle 200 length as captured in the infrared image 205, e.g., a length of the rectangle 295, may be 220 pixels. Additionally or alternatively, the first vehicle 100 computer 110 may project a size of the second vehicle 200 further based on other parameters such as a distance between the vehicles 100, 200 and/or an angle between the vehicles 100, 200 directions.

Verification of Vehicle Detection Based on Lidar Sensor Sweeps

Figure 3:
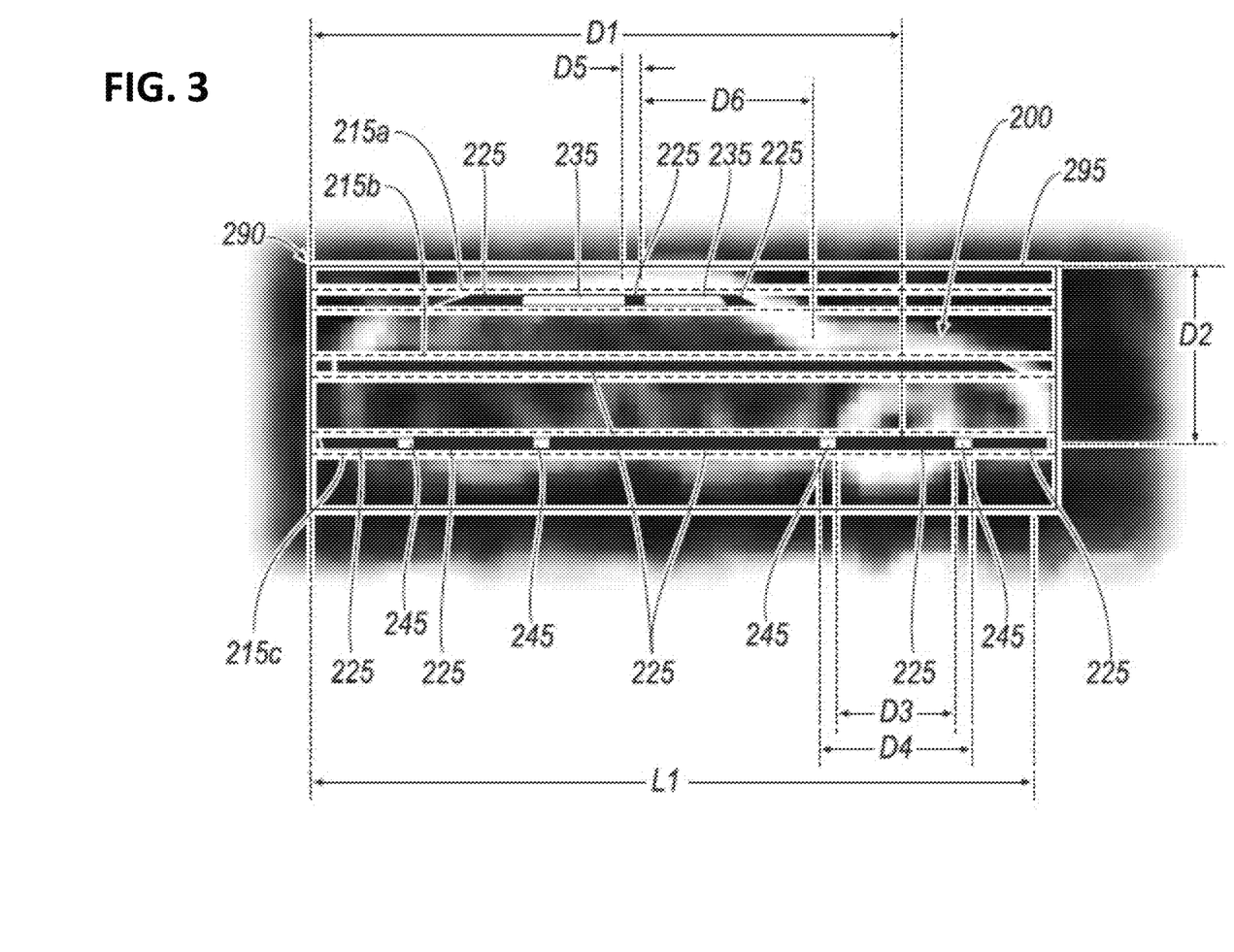
FIG. 3 is the infrared image of FIG. 2 with LIDAR sensor sweeps superimposed thereon.

FIG. 3 illustrates the infrared image 205 with LIDAR sensor 130 sweep areas 215 superimposed thereon. The first vehicle 100 computer 110 is programmed to determine whether the vehicle 200 elements, e.g., the body 280 components, e.g. front wheel 250, are at the predicted coordinates, e.g., D1, D2, based on the LIDAR sensor sweeps.

To determine whether the vehicle 200 elements are at the predicted coordinates, the first vehicle 100 computer 110 may be programmed to determine one or more sweep areas 215 (example sweep areas 215a, 215b and 215c are shown in FIG. 3, these each being referenced as a generic sweep area 215 for convenience in this description) based at least in part on the predicted coordinates of the one or more vehicle 200 elements. As one example, a sweep area 215 may include one or more portions of the area covered by the rectangle 295. Additionally or alternatively, the sweep area 215 may include the entire area (or volume) covered by the rectangle 295, specific points at the predicted coordinates, etc. The first vehicle 100 computer 110 may then perform multiple LIDAR sensor 130 sweeps in respective sweep areas 215 by transmitting LIDAR beams to the determined sweep area(s) 215, the computer 110 then receiving reflections of the transmitted LIDAR beams.

For example, the first vehicle 100 computer 110 may make a first estimate the vehicle 200 length based on a sweep area 215b extending between the vehicle 200 front and rear lights 260, 270. The first vehicle 100 computer 110 may then make a second estimate of the vehicle 200 length based on a reflecting area 225 of the sweep area 215b that reflects the LIDAR beams. The vehicle 100 computer 110 may then determine whether the vehicle 200 length identified based on the LIDAR sweeps is equal to a length L1 predicted to be associated with a specific type of body 280.

The first vehicle 100 computer 110 may be programmed to predict a size of a vehicle 200 element, e.g., a diameter D3 of the front wheel 250, a diameter D4 of the front wheel well 240, etc., and, based on the LIDAR sensor sweeps, determine whether the vehicle 200 element has a size matching the predicted size. For example, the first vehicle 100 computer 110 may determine whether the vehicle 200 front wheel 250 has a size matching its predicted size, e.g., whether a diameter D3 of the front wheel 250 and a diameter D4 of the front wheel well 240 match the predicted sizes. The vehicle 100 computer 110 may distinguish the areas 225, 245 of the sweep area 215c based on the distance from the LIDAR sensor 130 to the respective reflecting areas 225, 245. A surface of the wheel wells 240 has a longer distance to the LIDAR sensor 130 relative to an outer surface of the wheel 250.

As another example, the vehicle 100 computer 110 may be programmed to predict a distance between two vehicle elements, e.g., front and rear wheels 250, based at least in part on the determined body type and based on the LIDAR sensor sweeps. The vehicle 100 computer 110 can then determine whether the two vehicle elements are at the predicted distance from one another.

As discussed above, transparent and/or semitransparent surfaces may partially reflect LIDAR beams. Thus, the first vehicle 100 computer 110 may be programmed to receive reflections of the transmitted LIDAR beams at least by receiving a first reflection from a transparent vehicle 200 element, e.g., glass, and receiving a second reflection from an opaque vehicle 200 element. The computer 110 may be further programmed to determine whether the elements are at the predicted coordinates by detecting dimensions of the transparent vehicle elements based at least in part on the first reflection and the second reflection. For example, the vehicle 100 computer 110 may receive reflections of the sweep area 215A including reflections from transparent areas 225 of the side windows 230 and opaque areas 225 of the pillar 220. The vehicle 100 computer 110 may determine a pillar 220 width D5 and/or side windows 230 length D6 based on the areas 225, 235 of the sweep area 215A.

As another example, the vehicle 100 computer 110 may be programmed to receive multiple infrared images 205, determine a speed of the second vehicle 200 based at least in part on the infrared images 205. The vehicle 100 computer 110 may be further programmed to determine whether the elements are at the predicted coordinates further based on the determined speed of the identified vehicle 200.

Exemplary Process Flow

Figure 4:
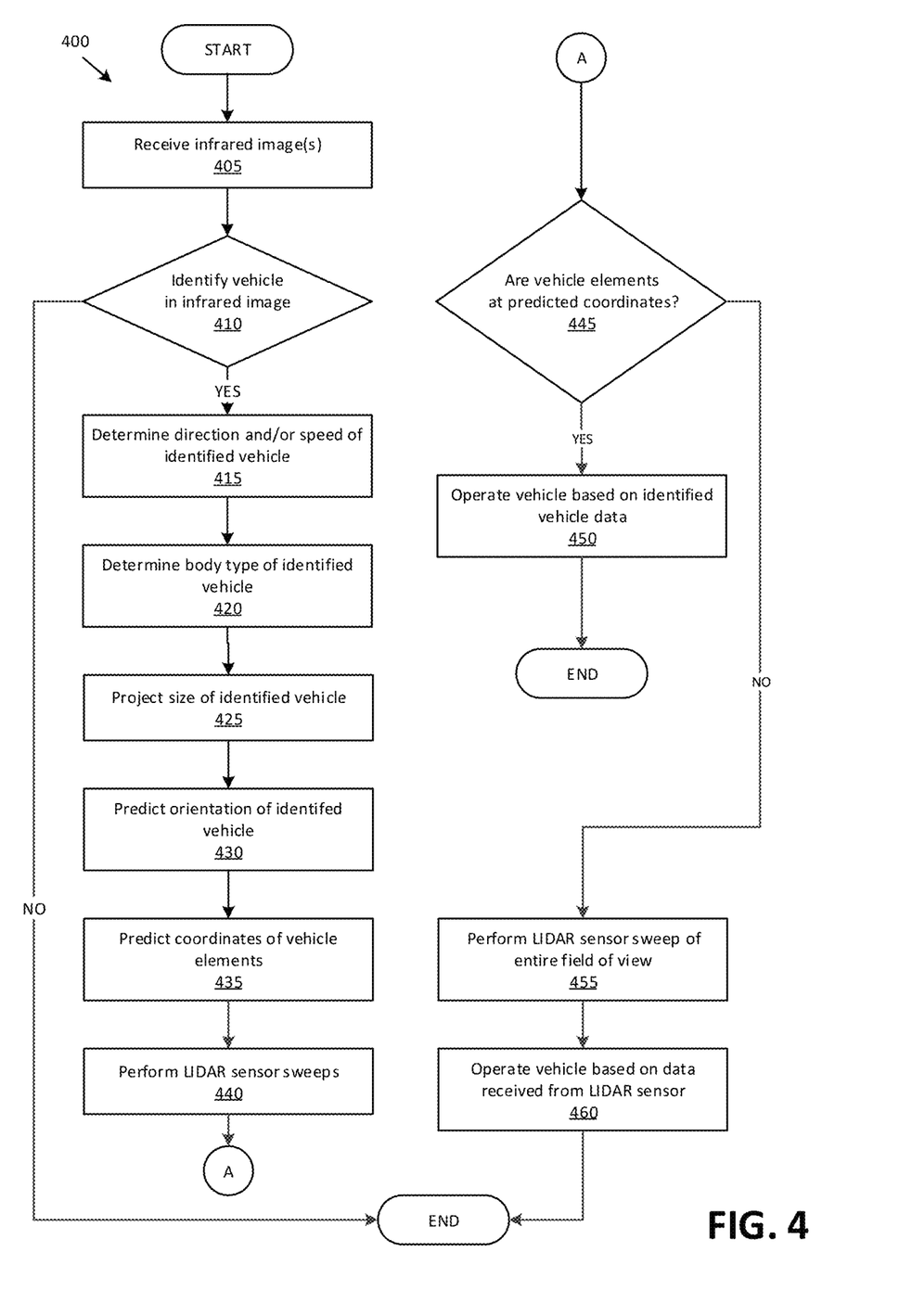
FIG. 4 is a flowchart of an exemplary process for detecting vehicles based on data from LIDAR and infrared sensors.

FIG. 4 illustrates an example process 400 for detecting a second vehicle 200 based on data received from the infrared sensor(s) 120 and the LIDAR sensor(s) 130 of the host vehicle 100. The first vehicle 100 computer 110 may be programmed to execute blocks of the example process 400 as described below.

The process begins in a block 405, in which the host vehicle 100 computer 110 receives one or more infrared images 205 from the vehicle 100 infrared sensor(s) 120. As one example, the vehicle 100 computer 110 may receive the infrared images 205 periodically, e.g., every 30 ms (milliseconds).

Next, in a decision block 410, the host vehicle 100 computer 110 may identify a second vehicle 200 in the received infrared image 205 using image processing techniques such as are known. If a second vehicle 200 is identified in the infrared image, the process 400 proceeds to a block 415; otherwise the process 400 ends.

In the block 415, the host vehicle 100 computer 110 determines a direction and/or a speed of the identified second vehicle 200 based on the received infrared images 205, e.g., based on changes in the second vehicle 200 location.

Next, in a block 420, the host vehicle 100 computer 110, still relying on the infrared images 205, determines a body type of the identified second vehicle 200, e.g., based on a shape and/or other attributes of the second vehicle 200. The body type may include dimensions of the body 280 and/or dimensions of various vehicle 200 elements.

Next, in a block 425, the host vehicle 100 computer 110 projects a size of the identified second vehicle 200 based on the infrared image 205 and/or data associated with the determined body type. For example, the host vehicle 100 computer 110 may project the size of the vehicle 200 based on a first size determined based on the associated body type and a second size identified based on the infrared image 205.

Next, in a block 430, the host vehicle 100 computer 110 predicts an orientation of the identified second vehicle 200. For example, the orientation of the identified second vehicle 200 can be defined as an angle between the longitudinal axes of the vehicles 100, 200.

Next, in a block 435, the host vehicle 100 computer 110 predicts coordinates of identified second vehicle 200 elements, e.g., pillars 220, wheels 250, etc., e.g., coordinates of a vehicle 200 elements relative to a reference point, e.g., the coordinates D1, D2 of the front wheel 250 center. The prediction of the second vehicle 200 elements coordinates may then be used for prediction of distances between vehicle 200 elements, e.g., front and rear wheels 250, and/or prediction of vehicle 200 elements size, e.g., the front wheel 250 diameter D3.

Next, in a block 440, the host vehicle 100 computer 110 performs LIDAR sensor 130 sweeps. For example, host vehicle 100 computer 110 may be programmed to determine one or more sweep areas 215 based at least in part on the predicted coordinates of the one or more vehicle 200 elements. The first vehicle 100 computer 110 may then perform multiple LIDAR sensor 130 sweeps in respective sweep areas 215 by transmitting LIDAR beams to the determined sweep area(s) 215 and then receiving reflections of the transmitted LIDAR beams.

As discussed above, the vehicle 100 computer 110 programmed in accordance with the process 400 may sweep an area 215 determined based on the identified second vehicle 200 body type. Thus, advantageously, the host vehicle 100 computer 110 may need to sweep a limited area of the LIDAR sensor 130 field of view rather than sweeping, e.g., an entire field of view of the LIDAR sensor 130. This may be beneficial because sweeping a limited area 215 rather than the entire field of view of the LIDAR sensor 130 may take less number of computation cycles at the host vehicle 100 computer 110.

Next, in a decision block 445, the host vehicle 100 computer 110 determines, based on the LIDAR sensor sweeps, whether the vehicle elements are at the predicted coordinates. In other words, the host vehicle 100 computer 110 verifies whether the predicted coordinates based on the determined body type match with coordinates determined based on the LIDAR sensor 130 sweeps. If the vehicle 100 computer 110 determines that the second vehicle 200 elements are at the predicted coordinates, then the process 400 proceeds to a block 450; otherwise the process 400 proceeds to a block 455.

In the block 450, the vehicle 100 computer 110 operates the vehicle 100 based on the data generated using the infrared image data, e.g., a size, location coordinates, a speed, and/or a direction of movement of the identified second vehicle 200. For example, the vehicle 100 computer 110 can use data such as coordinates of the second vehicle 200 to control vehicle 100 operation, e.g., for collision avoidance. Following the block 450, the process 400 ends.

In the block 455, the host vehicle 100 computer 110 performs LIDAR sensor 130 sweeps of an entire field of view of the LIDAR sensor(s) 130. Additionally or alternatively, the host vehicle 100 computer 110 may perform LIDAR sensor 130 sweeps of an area specified by the rectangle or solid rectangle 295.

Next, in a block 460, the host vehicle 100 computer 110 operates the vehicle 100 based on the data received from the LIDAR sensors 130. The data received from the LIDAR sensors 130 may include a size, location coordinates, a speed, and/or a direction of movement of the identified second vehicle 200. For example, the vehicle 100 computer 110 can use data received from the LIDAR sensor 130 such as coordinates of the second vehicle 200 to control vehicle 100 operation, e.g., for collision avoidance. Following the block 460, the process 400 ends.

Following the block 440, the process 400 may end or, although not shown in FIG. 4, if the vehicle 100 continues operation, the process 400 can return to the block 405.

Computing devices as discussed herein generally each include instructions executable by one or more computing devices such as those identified above, and for carrying out blocks or steps of processes described above. Computer-executable instructions may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media. A file in the computing device is generally a collection of data stored on a computer readable medium, such as a storage medium, a random access memory, etc.

A computer-readable medium includes any medium that participates in providing data (e.g., instructions), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of systems and/or processes herein are provided for the purpose of illustrating certain embodiments, and should in no way be construed so as to limit the disclosed subject matter.

Accordingly, it is to be understood that the present disclosure, including the above description and the accompanying figures and below claims, is intended to be illustrative and not restrictive. Many embodiments and applications other than the examples provided would be apparent to those of skill in the art upon reading the above description. The scope of the invention should be determined, not with reference to the above description, but should instead be determined with reference to claims appended hereto and/or included in a non-provisional patent application based hereon, along with the full scope of equivalents to which such claims are entitled. It is anticipated and intended that future developments will occur in the arts discussed herein, and that the disclosed systems and methods will be incorporated into such future embodiments. In sum, it should be understood that the disclosed subject matter is capable of modification and variation.

What is claimed is:

1. A computer, comprising a processor and a memory, the memory storing instructions such that the computer is programmed to:
    determine a body type of a first vehicle based on an infrared image received from an infrared sensor;
    predict coordinates of one or more first vehicle elements based at least on the determined body type;
    actuate a LIDAR sensor to sweep the one or more first vehicle elements; and
    based on LIDAR sensor sweeps received from the LIDAR sensor, operate a second vehicle by actuating an actuator of the second vehicle upon determining that the one or more first vehicle elements are at the predicted coordinates.

2. The computer of claim 1, further programmed to determine the body type of the first vehicle based at least in part on a shape of the first vehicle determined from the infrared image, wherein the shape includes at least one of a first vehicle height, a first vehicle length, a first vehicle width, and a distance between the one or more first vehicle elements.

3. The computer of claim 1, wherein the body type of the first vehicle is one of convertible, compact, mid-size sedan, full-size sedan, sport utility, minivan, van, and pickup truck.

4. The computer of claim 1, wherein the one or more first vehicle elements include a front windshield, a front light, a window, a rear light, a pillar, a wheel well, and a wheel.

5. The computer of claim 1, further programmed to:
    receive two or more infrared images;
    identify a direction of movement of the first vehicle based at least in part on the received two or more infrared images; and
    predict coordinates of the one or more first vehicle elements further based on the identified direction of movement.

6. The computer of claim 1, further programmed to:
    project a size of the first vehicle based on the infrared image; and
    predict coordinates of the one or more first vehicle elements further based on the projected size and a size associated with the determined body type.

7. The computer of claim 1, further programmed to:
    predict a size of one of the one or more first vehicle elements; and
    based on the LIDAR sensor sweeps, determine whether each one or more first vehicle elements has a size matching its predicted size.

8. The computer of claim 1, further programmed to:
    predict a distance between two first vehicle elements based at least in part on the determined body type; and
    based on the LIDAR sensor sweeps, further determine whether the two first vehicle elements are at the predicted distance from one another.

9. The computer of claim 1, further programmed to:
    predict an orientation of the first vehicle with respect to a second vehicle based on the infrared image; and
    predict coordinates of the one or more first vehicle elements of the first vehicle further based on the predicted orientation of the first vehicle with respect to the second vehicle.

10. The computer of claim 1, further programmed to:
    determine a sweep area based at least in part on the predicted coordinates of the one or more first vehicle elements of the first vehicle; and
    receive LIDAR sweep data from the LIDAR sensor by:
    transmitting LIDAR beams to the determined sweep area; and
    receiving reflections of the transmitted LIDAR beams.

11. The computer of claim 10, wherein the computer is further programmed to receive reflections of the transmitted LIDAR beams at least by:
    receiving a first reflection from a transparent vehicle element of the one or more first vehicle elements; and
    receiving a second reflection from an opaque vehicle element of the one or more first vehicle elements.

12. The computer of claim 11, further programmed to determine whether the one or more first vehicle elements are at the predicted coordinates by detecting dimensions of the transparent vehicle element based at least in part on the first reflection and the second reflection.

13. A method, comprising:
    determining a body type of a first vehicle based on an infrared image;
    predicting coordinates of one or more first vehicle elements based at least on the determined body type;
    actuating a LIDAR sensor to sweep the one or more first vehicle elements; and
    based on LIDAR sensor sweeps received from the LIDAR sensor, operating a second vehicle by actuating an actuator of the second vehicle upon determining that the one or more first vehicle elements are at the predicted coordinates.

14. The method of claim 13, wherein determining the body type of the first vehicle is based at least in part on a shape of the first vehicle determined from the infrared image.

15. The method of claim 13, further comprising:
    determining a sweep area based at least in part on the predicted coordinates of the one or more first vehicle elements of the first vehicle; and
    performing the plurality of LIDAR sensor sweeps by at least:
    transmitting LIDAR beams to the determined sweep area; and
    receiving reflections of the transmitted LIDAR beams.

16. The method of claim 15, wherein the sweep area includes at least the one or more first vehicle elements of the first vehicle.

17. The method of claim 13, further comprising:
receiving two or more infrared images;
identifying a direction of movement of the first vehicle based at least in part on the received two or more infrared images; and
predicting coordinates of the one or more first vehicle elements further based on the identified direction of movement.

18. The method of claim 13, further comprising:
projecting a size of the first vehicle based on the infrared image; and
predicting coordinates of the one or more first vehicle elements further based on the projected size and a size associated with the determined body type.

19. The method of claim 13, further comprising:
predicting a distance between two first vehicle elements based at least in part on the determined body type; and based on the LIDAR sensor sweeps, further determining whether the two first vehicle elements are at the predicted distance from one another.

20. A computer, programmed to:
identify a vehicle in an infrared image;
determine a body type of the vehicle based on the infrared image;
predict coordinates of one or more vehicle elements based at least on the determined body type;
receive LIDAR sweep data from a LIDAR sensor;
receive reflections of the transmitted LIDAR beams at least by receiving a first reflection from a transparent vehicle element of the one or more vehicle elements, receiving a second reflection from an opaque vehicle element of the one or more first vehicle elements; and
based on the LIDAR sensor sweeps, determine whether the one or more first vehicle elements are at the predicted coordinates by detecting dimensions of the transparent vehicle element based at least in part on the first reflection and the second reflection.

* * * * *